P. FUESS.
RECORDER.
APPLICATION FILED JUNE 16, 1914.
1,115,302. Patented Oct. 27, 1914.
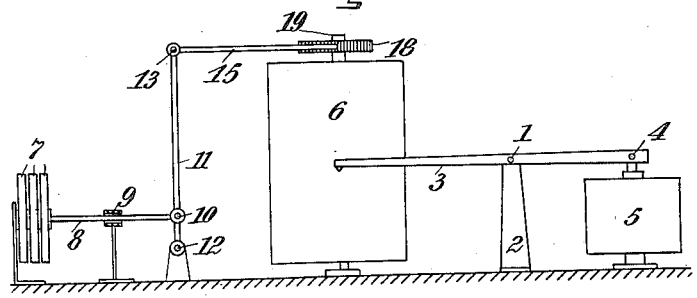
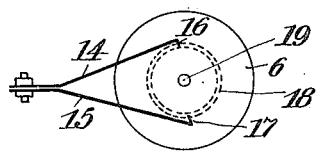
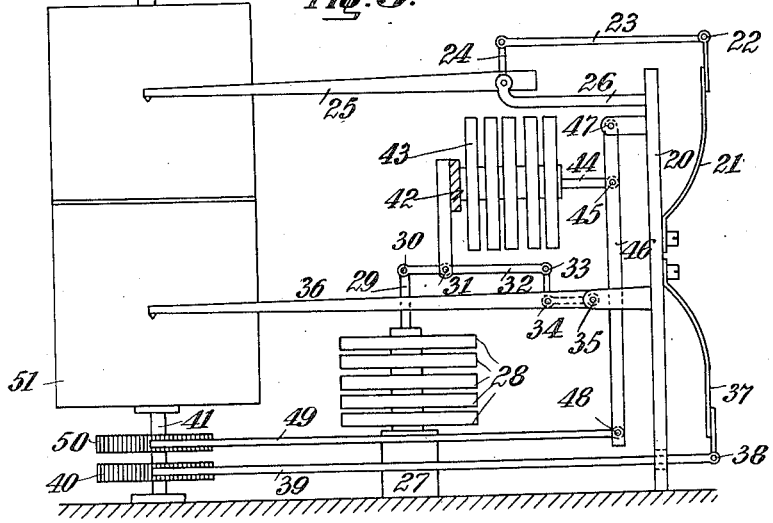
WITNESSES:
John C. Sanders
Albert F. Newman
INVENTOR:
Paul Fuess
BY M. Wallace White
ATT'Y.

UNITED STATES PATENT OFFICE.

PAUL FUESS, OF BERLIN-STEGLITZ, GERMANY.

RECORDER.

1,115,302.   Specification of Letters Patent.   Patented Oct. 27, 1914.

Application filed June 16, 1914. Serial No. 845,345.

*To all whom it may concern:*

Be it known that I, PAUL FUESS, subject of the Emperor of Germany, residing at Berlin-Steglitz, Germany, have invented new and useful Improvements in Recorders, of which the following is a specification.

The present invention relates to recorders, and consists in improved mechanism for driving the surfaces on which the records are made. These surfaces, hereinafter termed the recording surfaces, are usually either of drum form, and are carried by similarly formed means rotatable on a stationary axle, or of plate form, the similarly formed carrying means being then fed rectilinearly. In either case the values or measurements which it is desired to record appear in the form of curves, which result from these surfaces passing under the recording pen. The rotary or rectilinear motion of the said means is usually imparted by clockwork, which of course must be wound up from time to time. The inconvenience attending this frequent winding is particularly felt in the case of apparatus which remains erected for a very long time at places accessible only with difficulty, as for example at observatories on mountains and towers, in anchored balloons which are without occupant, in shafts, bore-holes and so on.

The object of the present invention is to obviate this drawback, and to this end, any one of the known, continuously operative forces of nature is utilized as the source of energy for actuating the mechanism for driving the recording surface. In this way, clockwork can be dispensed with and the recorder can be left to itself until the recording surface has been utilized to its full extent. For this purpose, the driving mechanism for the recording surface is operatively connected to a device which converts into motion the variations of a continuously operative natural force, for example, of the pressure or temperature of the air. The said device may consist of a baroscope, thermoscope, hygroscope or the like. The operative connection is such that the movements produced by the particular device when the said variations occur actuate the said mechanism and the recording drum therefore makes a further movement only when a change in the natural force (pressure, temperature, humidity) occurs.

Two embodiments of the present invention are illustrated by way of example in the accompanying drawing, wherein:—

Figure 1 shows a device comprising a baroscope for feeding a recording surface of drum shape, Fig. 2 is a top plan view of the feed-mechanism for the drum, and Fig. 3 shows a device comprising both a baroscope and a thermoscope for feeding the drum, the latter recording both the barometric and thermometric variations.

Referring to Fig. 1, showing the barometric recorder, the pen-carrying lever 3 is mounted to rock on the frame 2 by means of the pivot 1, and is linked to the exhausted measuring chamber 5 by means of the pivot 4. In this way the said lever, by means of the pen thereon, records on the recording surface of the drum 6 the elongations and contractions of the said chamber.

In this apparatus, the variations in atmospheric pressure serve as the actuating force for rotating the drum. This is effected by means of the metal chambers 7, which carry a rod 8 slidable in the guide 9 and pivotally connected at 10 to the lever 11. This lever 11 at one end is pivoted at 12 to the frame and at the other end 13 is pivoted to the forked member 14, 15. At the two ends of this member are provided pawls 16, 17 which are inclined to the periphery of the toothed wheel 18 and are substantially parallel to one another. These pawls engage the wheel 18 which has very small teeth and is fast on the axle 19 of the drum. The axle 19 is rotatably mounted at its lower end, and is rigidly connected to the drum.

The above-described device operates as follows:—When, owing to a change in atmospheric pressure, the metal chambers 7 expand, they drive the rod 8 to the right. The lever 11 therefore swings to the right by turning about the pivotal axis 12 and the forked pawl-member is also shifted to the right. The pawl 16 which is directed rightwardly therefore rotates the toothed wheel 18, and consequently the drum 6, on the axle 19, the direction of rotation being clockwise. The leftwardly directed pawl 17, however, rides over the teeth as they pass under it and so remains out of gear. When the chambers 7 again contract as the result of the action of atmospheric pressure, the system 8, 11, 14, 15, moves leftwardly, the leftwardly-directed pawl therefore coming into gear, while the rightwardly directed pawl 16 rides over the ratchet teeth. The drum therefore always rotates in the same direction. The extent of its rotation depends on the variations of pressure which are manifested by the metal chambers 7.

Instead of the baroscope 7, 8 a device influenced by the variations of any other force of nature may be employed for transmitting motion to the driving mechanism of the recording surface. Such devices include a thermoscope, hygroscope and the like.

Referring to the embodiment shown in Fig. 3, the drum is here fed forward by two sets of mechanism of the kind shown in Fig. 2, the upper set being driven, as before, by a baroscope, and the lower set being now driven by a thermoscope. The apparatus is so constructed that both the variations in atmospheric pressure as well as in temperature are each recorded by a separate pen on the drum. To this end, the stationary wall 20 of the frame carries, securely fastened to it, a metal plate 21, which is highly sensitive to temperature variations and the free end 22 of which is operatively connected with a recording arm 25 by means of rods 23, 24. The recording arm is pivoted to an arm 26 fast on the wall 20. On the support 27 is mounted the set of metal chambers 28 for measuring atmospheric pressure, which, by means of the rod 29 pivoted at 30 actuate a rod 32 fulcrumed about the stationary axis 31. The rod 32 is connected by links 33, 34 to the rotatable axle 35 of the recording arm 36.

Screwed to the wall 20 is a second metal plate 37 which is sensitive to temperature and which is pivoted at 38 to the stem of the forked member 39. The latter member carries at its forked ends pawls which, in the manner shown in Fig. 2, are so directed that they turn the toothed wheel 40 in the same direction no matter whether they move backward or forward. This toothed wheel is fast on the vertical axle 41 of the drum.

The wall of the frame carries, rigidly mounted at 42, a second set of metal chambers 43, to which a rod 44 is rigidly secured. This rod is pivoted at 45 to the lever 46, which is fulcrumed on a stationary axis 47 and is pivoted at 48 to a forked member 49. The latter is likewise provided with pawls as in Fig. 2 which engage the toothed wheel 50 fast on the axle 41 of the drum. At each movement of the forked member 49, these pawls turn the drum-axle in one and the same direction, i. e., the same direction in which the pawls of the member 39 turn it. At the same time, owing to variations in air temperature, the plate 37 extends or bends and transmits its motion by way of the joint 38 to the forked member 39, which, by means of its pawls, likewise turns the drum-axle.

The recording surface may serve to record the variations of each particular force of nature, or any desired number of forces simultaneously, the records in the latter case being superposed. The last described apparatus with two or more sets of driving mechanism is advantageous in that stoppage of the driving mechanism and recording surface is almost impossible, for in very rare cases are two or more forces of nature absolutely constant, i. e. without variation, at the same time. When one force of nature remains unchanged, the variations of the other are available, so that practically always one or the other driving mechanism is in action. In this way, by employing this embodiment, continuous forward movement of the recording surface can be insured. Also, in case one of the sets of mechanism gets out of order for any reason, the movement of the recording surface is not arrested, because then, the other natural force which is utilized continues to operate its particular set of mechanism. The recording surface travels quicker in this embodiment than with only one driving force. Consequently greater abscissæ are usually furnished for the records, and in that way greater distinctness and clearness are obtainable. In addition the movement of the recording surface is more regular and this contributes to better records being produced.

What I claim as my invention and desire to secure by Letters Patent is:—

1. In recorders, the combination with a recording surface, of means actuable by a continuously operative varying force of nature for driving said surface in one direction only during all variations in the operative force.

2. In recorders, the combination with a recording surface, of mechanism actuable in either direction for driving said surface in one direction only, and a device movable in accordance with variations in a continuously operative force of nature and operatively connected to said mechanism to actuate the same during all variations of the operative force.

3. In recorders, the combination with a recording surface, and means for registering on said surface values in accordance with variations in a force of nature, of means actuable by a continuously operative force of nature for driving said surface in one direction only during all variations in the operative force.

4. In recorders, the combination with a recording surface, and means for registering on said surface values in accordance with variations in a continuously operative varying force of nature, of means actuable by the same force of nature for driving said surface in one direction only during all variations in the operatives force.

5. In recorders, the combination with a recording surface, of means actuable by a plurality of continuously operative varying forces of nature for driving said surface in one direction only during all variations of the operative forces.

6. In recorders, the combination with a recording surface and means for simultaneously registering on said surface values in accordance with the variations of a plurality of continuously operative varying forces of nature, of means actuable by the same forces of nature for driving said surface in one direction only during all variations of the operative forces.

7. In recorders, the combination with a plurality of recording surfaces and means for simultaneously registering on each surface values in accordance with the variations of a continuously operative force of nature, of means actuable by all these forces of nature for driving said surfaces simultaneously in one direction only during all variations of the operative forces.

8. In recorders, the combination with a plurality of recording surfaces and means for registering on each surface values in accordance with the variations in a continuously operative force of nature, of a plurality of sets of mechanism actuable in either direction for driving the recording surfaces simultaneously in one direction only, and a plurality of devices actuable in accordance with variations of the same forces of nature, and each operatively connected to a set of said mechanism to actuate the same during all variations of the operative force.

In testimony whereof I have signed my name to this specification in the presence of two subscribing witnesses.

PAUL FUESS.

Witnesses:
HENRY HASPER,
WOLDEMAR HAUPT.